United States Patent
Labatte

(10) Patent No.: US 6,360,339 B1
(45) Date of Patent: Mar. 19, 2002

(54) METHOD AND SYSTEM OF DYNAMICALLY SELECTING A DATA COALESCE TECHNIQUE IN A COMPUTER SYSTEM

(75) Inventor: Timothy E. W. Labatte, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/340,616

(22) Filed: Jun. 29, 1999

(51) Int. Cl.$^7$ .............................................. G06F 11/00
(52) U.S. Cl. ...................................................... 714/704
(58) Field of Search ................................ 714/704, 799; 370/412, 242

(56) References Cited

U.S. PATENT DOCUMENTS 6,023,737 A * 2/2000 Petersen et al. .............. 710/20
6,078,587 A * 6/2000 Lynch et al. ................ 370/412

* cited by examiner

Primary Examiner—Phung M. Chung
(74) Attorney, Agent, or Firm—Pillsbury Winthrop LLP

(57) ABSTRACT

The present invention discloses a method and system of dynamically selecting a technique to coalesce data that optimally transports data between a controller and computer system memory, based on the computer system capabilities and system bus loads. The network controller is coupled to a data communications network and to a computer system bus infrastructure, which facilitates data transport. The system examines the contents of system configuration parameters, determines the preference of a first data coalesce technique, which is system bus-intensive and maximizes throughput. The system transports network-bound data from system memory to the network controller in accordance with this first data coalesce technique. Transmit underrun error statistics of the network controller are collected and examined at regular intervals. If the error statistics exceed a predefined transmit error threshold, the system automatically switches to a second data coalesce technique that is not as system bus-intensive nor as fast.

28 Claims, 8 Drawing Sheets

METHOD AND SYSTEM OF DYNAMICALLY SELECTING A DATA COALESCE TECHNIQUE IN A COMPUTER SYSTEM

BACKGROUND OF THE INVENTION

1. Field of the Invention

This invention generally relates to the field of data communication networks. More particularly, the present invention relates to a system and method of dynamically selecting a data coalescing technique that optimally transports data between a network controller and computer system memory, based on the capabilities of the computer system and its system bus loads.

2. Description of Related Art

Keeping up with the increasing traffic in data communications networks is an ever-present challenge. This challenge is exacerbated by the need to also achieve optimal computer system performance while maintaining network reliability.

FIG. 1 (Prior Art) illustrates the basic components of a networked computer system 100. The computer system implements a Peripheral Component Interconnect (PCI) bus infrastructure 105 to communicate between the various components. The microprocessor 160 is connected to the PCI bus 105 and is supported by the system main memory (RAM) 170 and read-only memory (ROM) 155. The main memory 170 includes the operating system of the computer (OS) 190 as well as a network operating system 175, a transport mechanism 185, and a protocol support 180 to achieve network communications pursuant to the conventional seven-layered Open Systems Interconnect model. The transfer of data between components is controlled by the memory manager 150, which is connected to PCI bus 105 and regulates Direct Memory Access (DMA) transfer operations.

As shown in FIG. 1, the computer system 100 interfaces with the network link 195 via the network controller 110. The network controller 110 is coupled to the PCI bus 105 and directly attaches to the network link 195. Typically, the system 100 engages memory manager 150 to utilize DMA transport mechanisms to transfer data between the system main memory 170 and the network controller 195 via the PCI bus 105.

FIG. 2 depicts a data packet 210 to be transferred from main memory 170 to the network controller 195. The packet 210 is configured in accordance with the Network Driver Interface Specification (NDIS), developed jointly by Microsoft and 3Com (see *Network Driver Interface Specification* 3.0, released in 1989). NDIS provides a standardized control interface for network controller drivers and protocol drivers and specifies a layered protocol stack for configuring network-bound packets. Accordingly, NDIS packets 210 have pointers 212, 214, 216 indicating the location of NDIS buffers 230, 240, 250. These buffers 230, 240, 250 are locations in main memory where the data to be transferred is actually stored.

Generally, each NDIS packet 210 comprises data from the 3 separate NDIS buffers 230, 240, 250. For example, in transferring a typical 1514-byte frame emerging from a TCP/IP protocol stack, the NDIS interface initially assembles the frame data as an NDIS packet 210. Thus, 14 bytes of TCP/IP data reside in the first NDIS buffer 230, 40 bytes of the data reside in the second NDIS buffer 240, and 1460 bytes of the data reside in the third NDIS buffer 250.

To route the NDIS packets 210 from main memory 170 to the network controller 110, and ultimately to their network destination, the packets 210 must first be transported to the PCI bus 105. This operation can be accomplished by incorporating data coalescing techniques. Essentially, coalescing techniques copy the content of one or more memory locations to another memory location. One such data coalescing technique is demonstrated in FIG. 2. This technique, referred to as "smart coalescing", incorporates a Transmit Control Block (TxCB) 220 data structure and an immediate data memory area 225, which attaches to the TxCB 220. The TxCB 220 is a specific data structure used by the system hardware to identify the location of desired data. Using this smart coalescing technique, the system accesses the NDIS buffers 230, 240, 250, and if the contents of these buffers are small enough, the system copies their contents into the immediate data memory area 225 and then transfers the data to the PCI bus 105. As illustrated in FIG. 2, because NDIS buffer 230 contains 14 bytes of data while NDIS buffer 240 contains 40 bytes of data, the contents of these buffers are small enough to be copied 231, 232, 241, 242 into immediate data memory area 225.

If a buffer's content is too large to be copied, the smart coalescing directs the system to map a pointer 260 to the buffer and to store the pointer 260 information in the TxCB 220. The system then transfers 270 the pointer 260 information, as well as the data in the buffer 250, onto the PCI bus 105 as one block of data. For example, because NDIS buffer 250 is so large (e.g., 1460 bytes), as shown in FIG. 2, the smart coalescing technique maps a pointer 260 to the buffer 250 and stores it in the TxCB 220. The system then reads the pointer 260 in TxCB 220 and transfers 270 the pointer 260 information and the contents of buffer 250 onto the PCI bus 105 without copying.

Therefore, for every TCP/IP frame to be transferred, the smart coalescing technique copies the contents of 2 of the 3 buffers (i.e., 130 and 140) for a total of 54 bytes. However, copying data onto the PCI bus 105, even as little as 54 bytes worth, requires microprocessor 160 intervention, which tasks the microprocessor 160 and ultimately degrades system performance. This is supported by recent performance tests, which indicate that the most efficient data coalescing technique performs no coalescing whatsoever. Rather, by physically mapping all of the NDIS buffers 230, 240, 250 and transferring them on the PCI bus 105 as a single TCP/IP frame, the microprocessor 160 is not utilized and system performance increases significantly.

FIG. 3 illustrates a non-coalescing technique. This technique instructs the system to read the pointer information 322, 324, 326 of the TxCB 120, which reference the NDIS buffers 230, 240, 250, respectively. The pointer information 322, 324, 326 is then transferred 327 to the PCI bus 105 as one block of data. In addition, the system, based on the pointer information 322, 324, 326, maps the data contained in each of the NDIS buffers 230, 240, 250, and automatically transfers 328, 329, 330 the data onto the PCI bus 105 as 3 additional data blocks. As such, this non-coalesce technique requires 4 separate transfers to transmit the 4 blocks of data across the PCI bus 105. Because the data is not coalesced or copied onto the PCI bus 105, but is physically mapped and transferred onto the bus 105, the data is transferred without any microprocessor 160 intervention. As such, there is minimal microprocessor 160 utilization.

One potential problem with this non-coalesce technique is its tendency to burden the PCI bus 105. As shown above, the non-coalesce technique requires 4 transfers across the PCI bus 105 to accommodate 1 TCP/IP frame. Each transfer commits the system to negotiate for the control of the PCI bus 105 in order to transfer each data block. If the PCI bus 105 is under heavy usage or cannot sustain a heavy steady state load of data, data may not reach the network controller within a reasonable amount of time. For example, FIG. 4 depicts that, before being transmitted across the network, the PCI bus 105 funnels data into the network controller FIFO buffer 410 which contains a transmit threshold 405. The transmit threshold 405 is the level that the data in the buffer 410 must accumulate to, before the buffer 410 begins transmitting data. Clearly, the lower the transmit threshold 405, the lower the transmission delays, the higher the throughput, and the more efficient the network. To this end, the network controller 110 begins transmitting across the physical network link 195 as soon as the buffered data reaches the transmit threshold 405. Such transmission takes place even if all the data for a given packet has not arrived in the FIFO buffer 410. Therefore, if, due to PCI bus 105 congestion problems or arbitration issues, the data does not arrive within a reasonable amount of time (i.e., before the FIFO buffer 410 empties out), severe transmit under-run errors will occur and the integrity of the network will be compromised.

What is needed is a system and method that monitors the PCI bus loads and dynamically selects a data coalescing technique to maximize performance while minimizing transmit errors due to PCI bus constraints.

SUMMARY

Systems and methods consistent with the principles of the present invention address the need identified above by providing a system and method that monitors the PCI bus loads and dynamically selects a data coalescing method to maximize performance while minimizing transmit errors due to PCI bus constraints.

A system and method, consistent with the principles of the present invention as embodied and broadly described herein, includes a network controller, coupled to a data communications network and to a computer system bus infrastructure, which facilitates data transport. The system examines the contents of system configuration parameters, determines the preference of a first data coalesce technique, which is system bus-intensive and maximizes throughput. The system transports network-bound data from system memory to the network controller in accordance with this first data coalesce technique. Transmit underrun error statistics of the network controller are collected and examined at regular intervals. If the error statistics exceed a predefined transmit error threshold, the system automatically switches to a second data coalesce technique that is not as system bus-intensive nor as fast.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components, it being understood that a person of ordinary skill in the art would be able to design software and control hardware to implement the embodiments based on the description herein.

Figure 1:
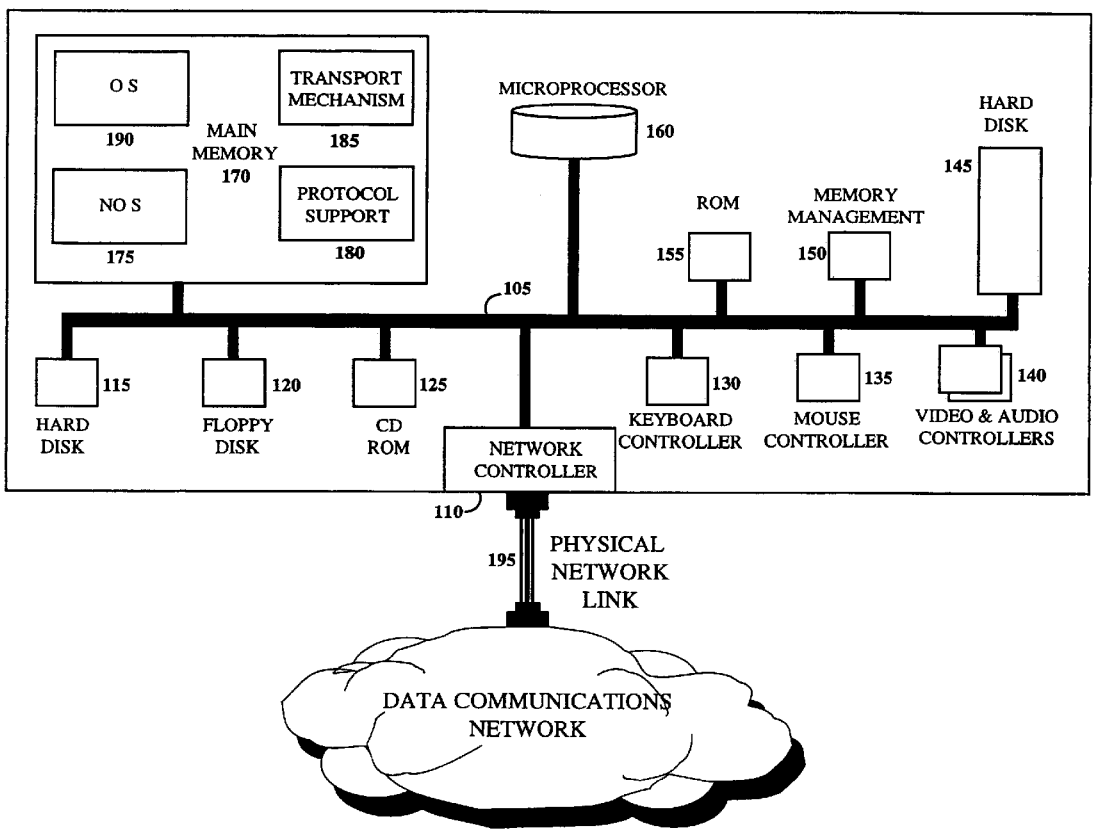
FIG. 1 (Prior Art) is a block level diagram illustrating the components of a networked computer system.
Figure 2:
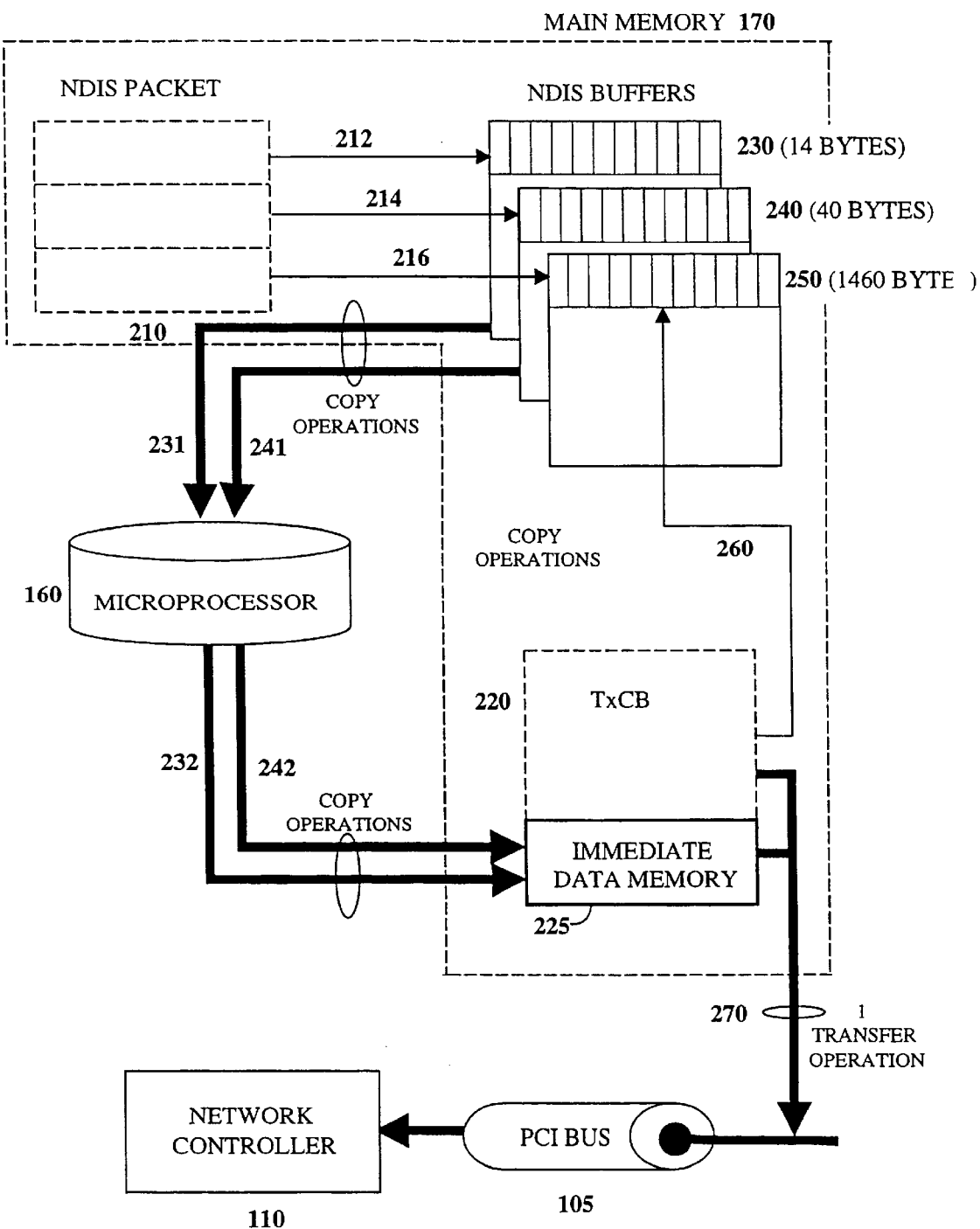
FIG. 2 is a system level block diagram depicting a data coalesce method for transferring data across a PCI bus.
Figure 3:
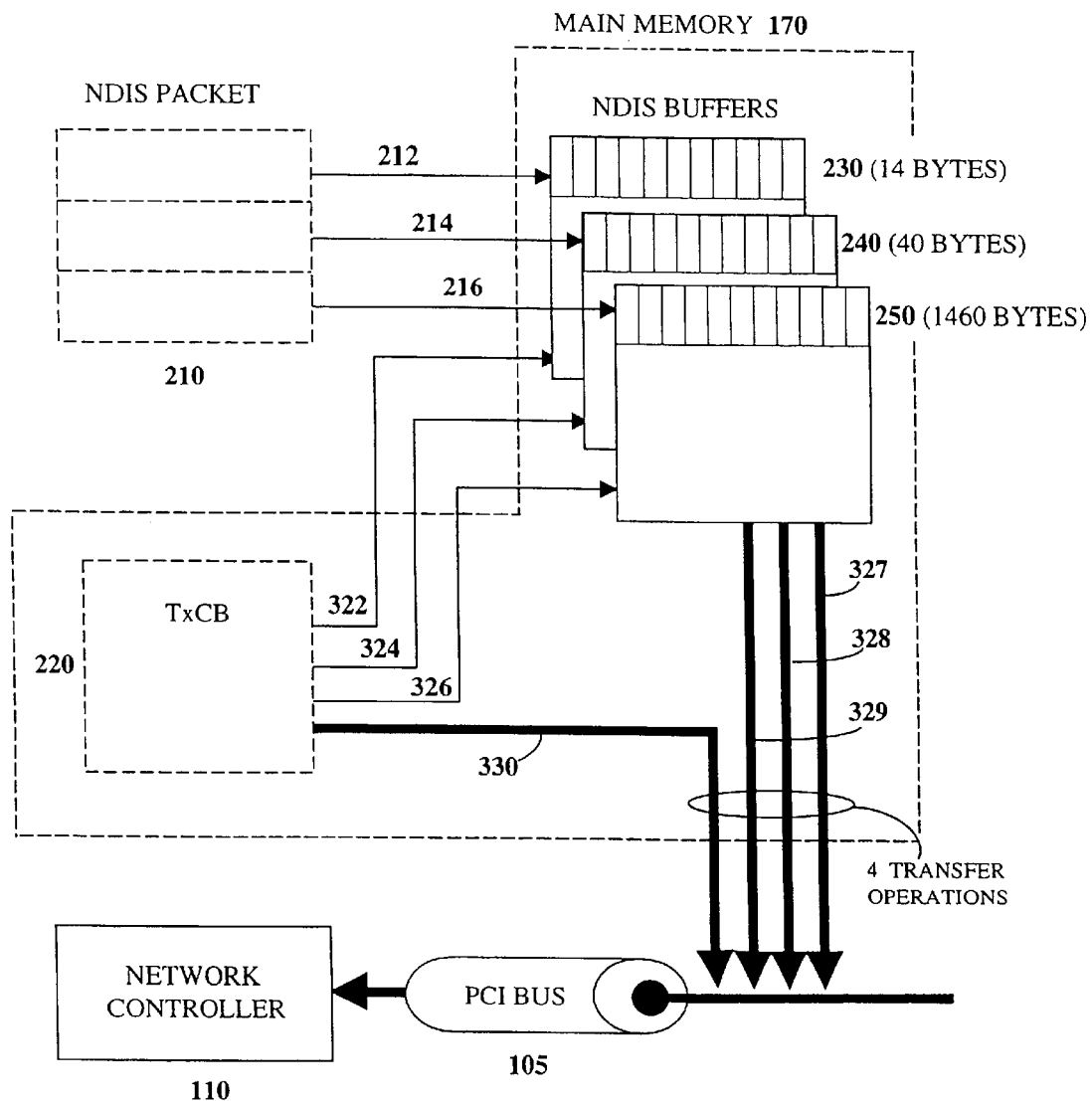
FIG. 3 is a system level block diagram depicting a non-coalesce method for transferring data across a PCI bus.
Figure 4:
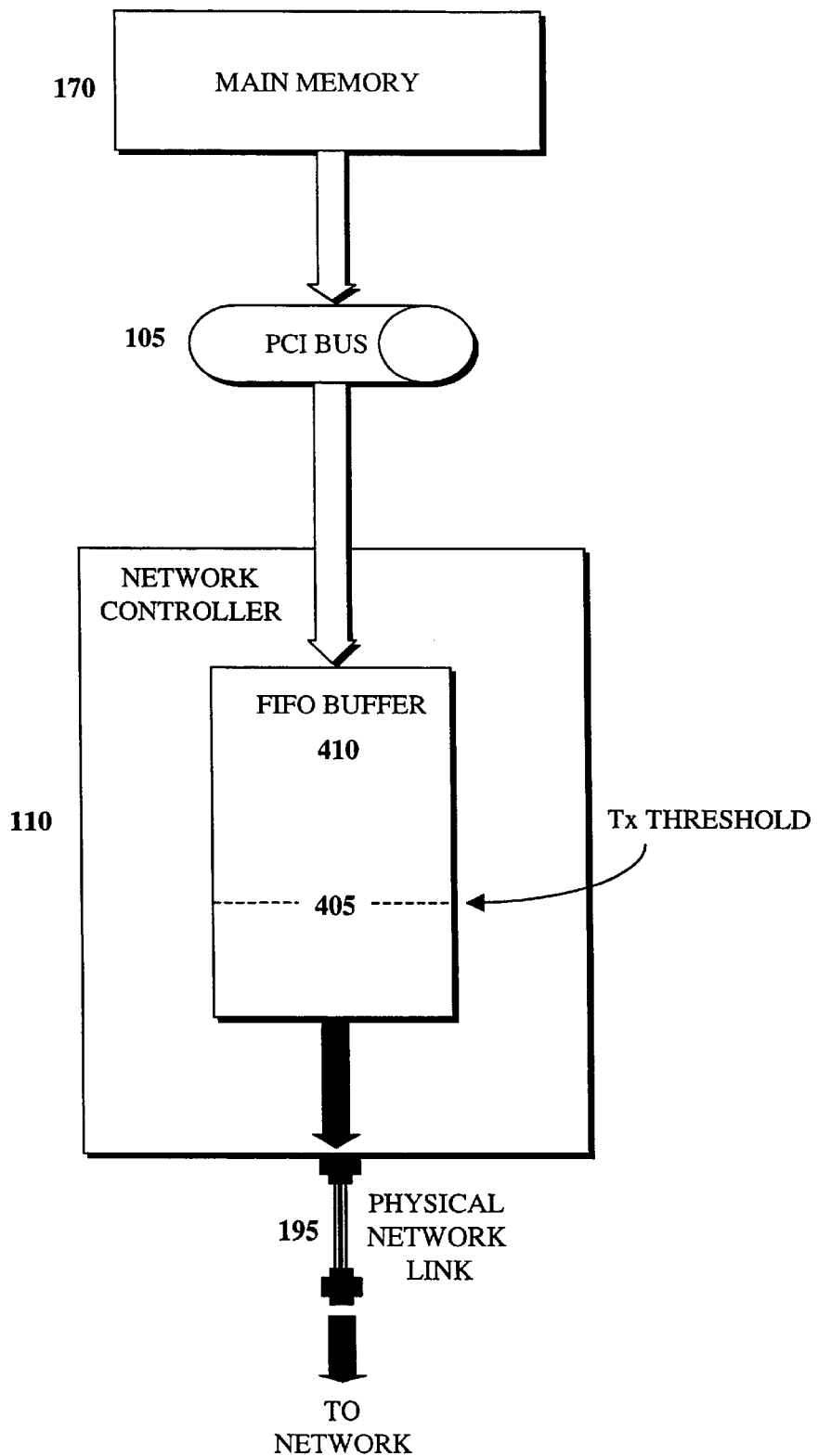
FIG. 4 is a system level block diagram illustrating the structure of a network controller.
Figure 5:
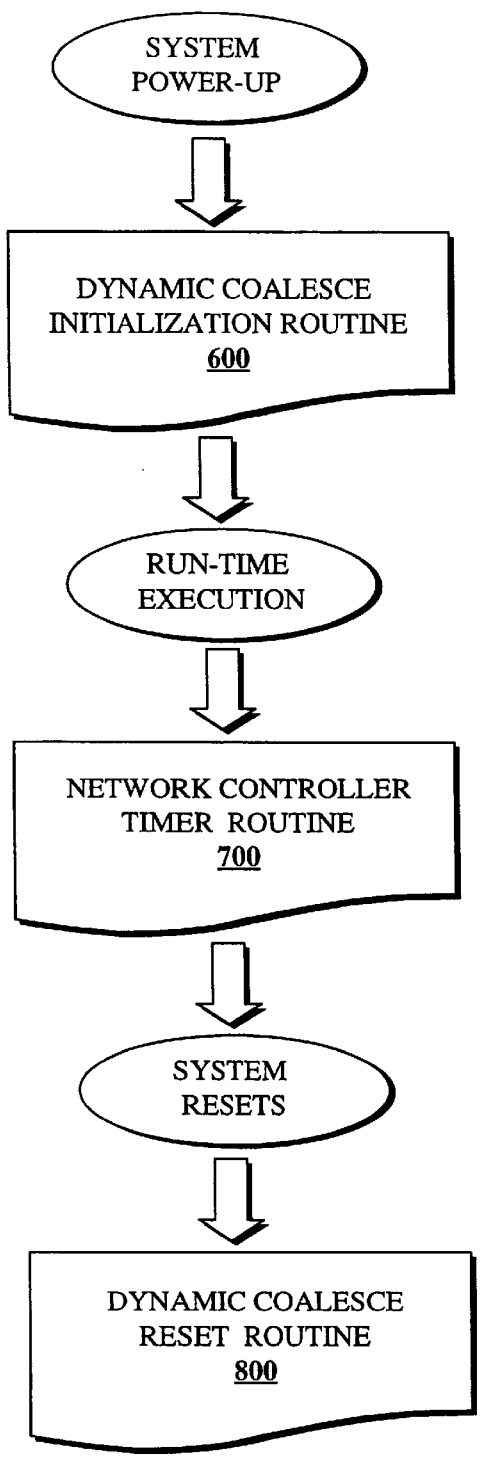
FIG. 5 is a high-level flow diagram depicting the inter-relationship between different aspects of the present invention.

FIG. 5 illustrates an embodiment of the present invention. The embodiment includes a dynamic coalesce initialization routine 600 which is invoked during system start-up, a network controller timer routine 700 which executes at regularly-timed intervals, and a dynamic coalesce reset routine 800 which is triggered during a network controller or system reset operation. These routines may be stored in any storage device, such as, for example, a computer system main (non-volatile) memory 170, an optical disk 125, magnetic tape or disk 120, or on the memory, if any, incorporated in the network adapters. Furthermore, these routines may be programmed when the system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

Figure 6:
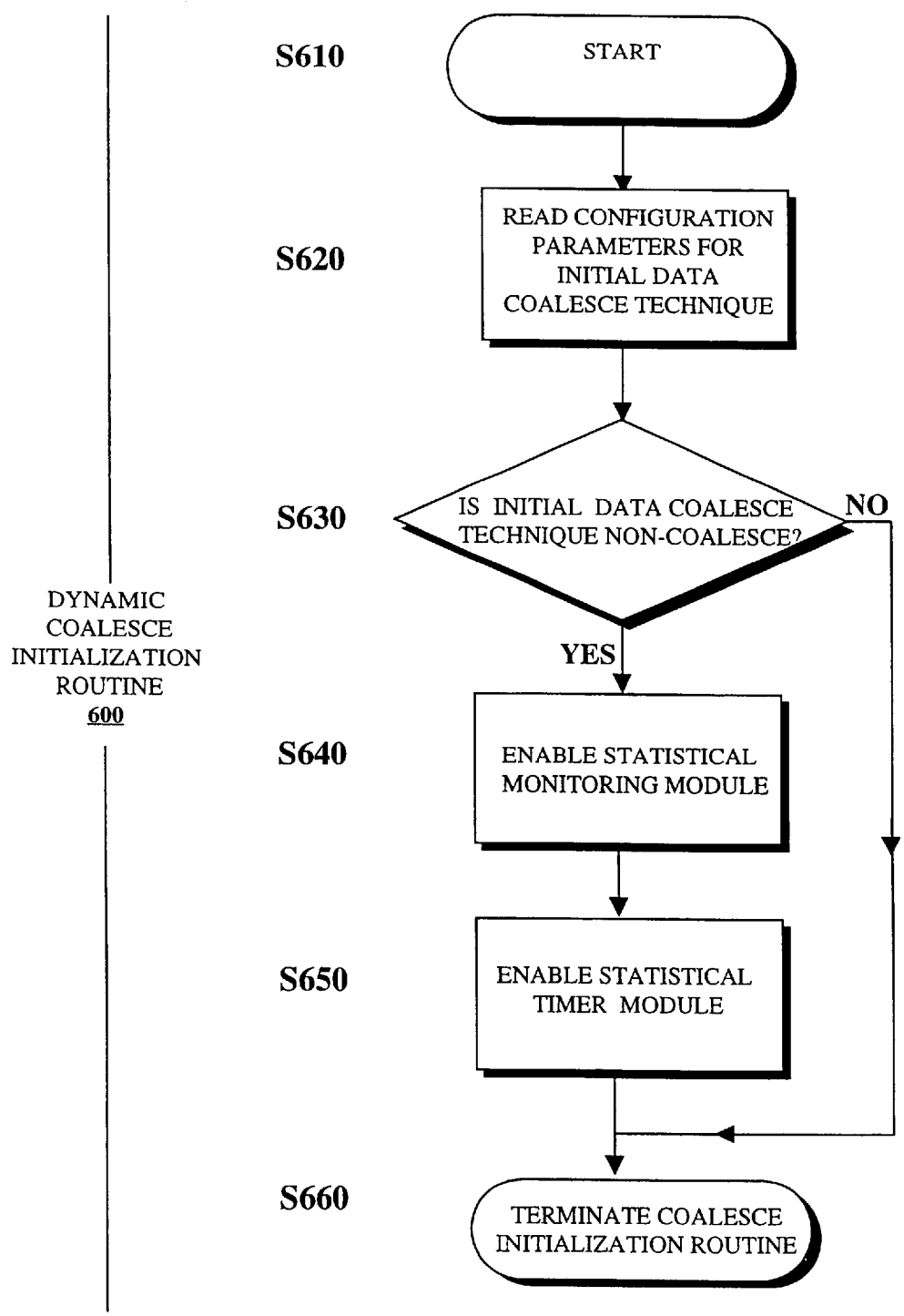
FIGS. 6, 7, and 8 are high-level flow diagrams depicting the operation of an embodiment of the present invention.

As shown in FIG. 6, the first part of the embodiment is the dynamic coalesce initialization routine 600, which is triggered at system start-up S610. In step S620, the initialization routine 600 first reads the system configuration parameters for the initial coalesce technique. In step S630, the routine 600 queries the system to determine if the initial technique is the non-coalescing technique. If the initial technique is not the non-coalesce technique, then the initialization routine 600 terminates. If the initial technique is the non-coalesce technique, then the routine 600 progresses to step S640.

In step S640, the routine 600 enables the statistical monitoring module, which monitors/collects the network controller statistics and determines whether the present coalesce technique needs to be switched. The monitoring module may include a statistical time interval for defining a statistics collection time, a predefined transmit error threshold, a data coalescing switchover threshold, a mechanism for tallying transmit underrun errors, and a mechanism for tracking data coalescing technique switchovers.

In step S650, the routine 600 enables the statistical timer module, which provides the monitoring timing interval. The timing interval may, for example, be set to drive the statistical monitoring module every 1 to 2 seconds. After enabling the timer module, the initialization routine 600 terminates, as shown in step S660.

Figure 7:
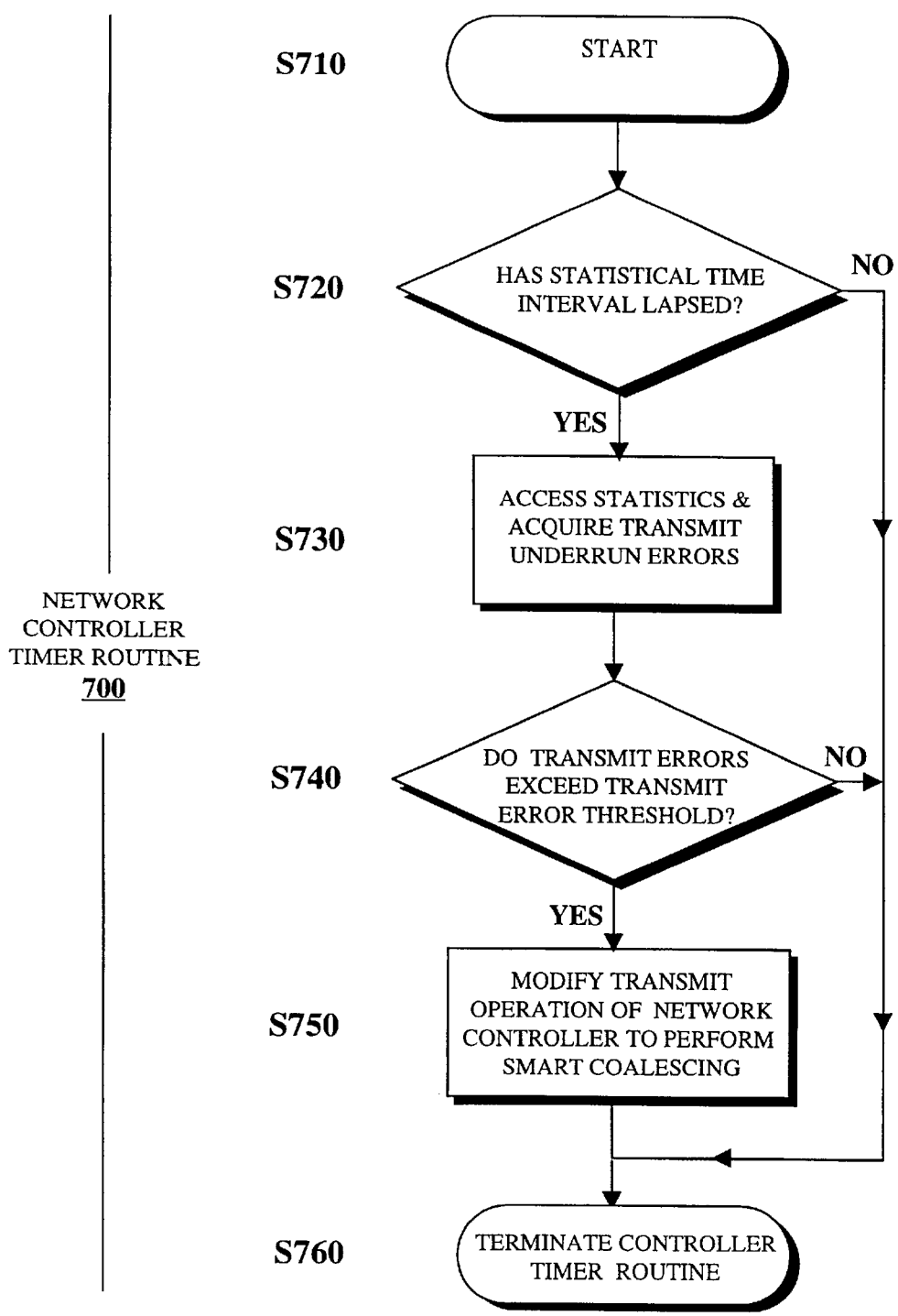

FIG. 7 illustrates the second part of this embodiment, the network controller timer routine 700 which, after the dynamic coalesce initialization routine 600 is completed, executes at regularly-timed intervals in accordance with step S650. As shown in step S720, the timer routine 700 first determines whether the statistical time interval, enabled in the statistical monitoring module of FIG. 6 step S640, has lapsed. The statistical time interval is the time needed to collect the sufficient statistics and may be longer than the monitoring timing interval of step S650. For example, the statistical time interval may be set for 5 seconds. If the statistical time interval has not lapsed, the timer routine 700 terminates, as shown in step S760. If the statistical time interval has lapsed, then the timer routine 700 advances to step S730.

In step S730, the timer routine 700 accesses the network controller statistics enabled by step S640 in FIG. 6. In step S740, the timer routine 700 determines whether the tally of transmit errors, contained within the collected statistics, exceed the transmit error threshold as defined in the statistical monitoring module of FIG. 6 step S640. If the statistics indicate that the error threshold has not been exceeded, the timer routine 700 terminates, as shown in step S760. If the statistics indicate that the threshold has been exceeded, then the timer routine 700 progresses to step S750.

In step S750, the timer routine 700 modifies the transmit operation of the network controller to switch data coalesce techniques. The fact that the transmit error threshold has been exceeded, indicates that there are PCI bus load or congestion issues. To alleviate PCI bus loading, the timer routine directs the network controller to switch from the higher throughput, PCI-intensive, non-coalesce data transfer technique to the "smart" coalesce data transfer technique. As stated above, the smart coalesce technique copies smaller buffers of data which minimizes PCI bus negotiations. This will increase microprocessor 160 utilization but will significantly minimize the occurrence of transmit errors. After data transfer technique switchover, the timer routine 700 terminates, as indicated in step S760.

Figure 8:
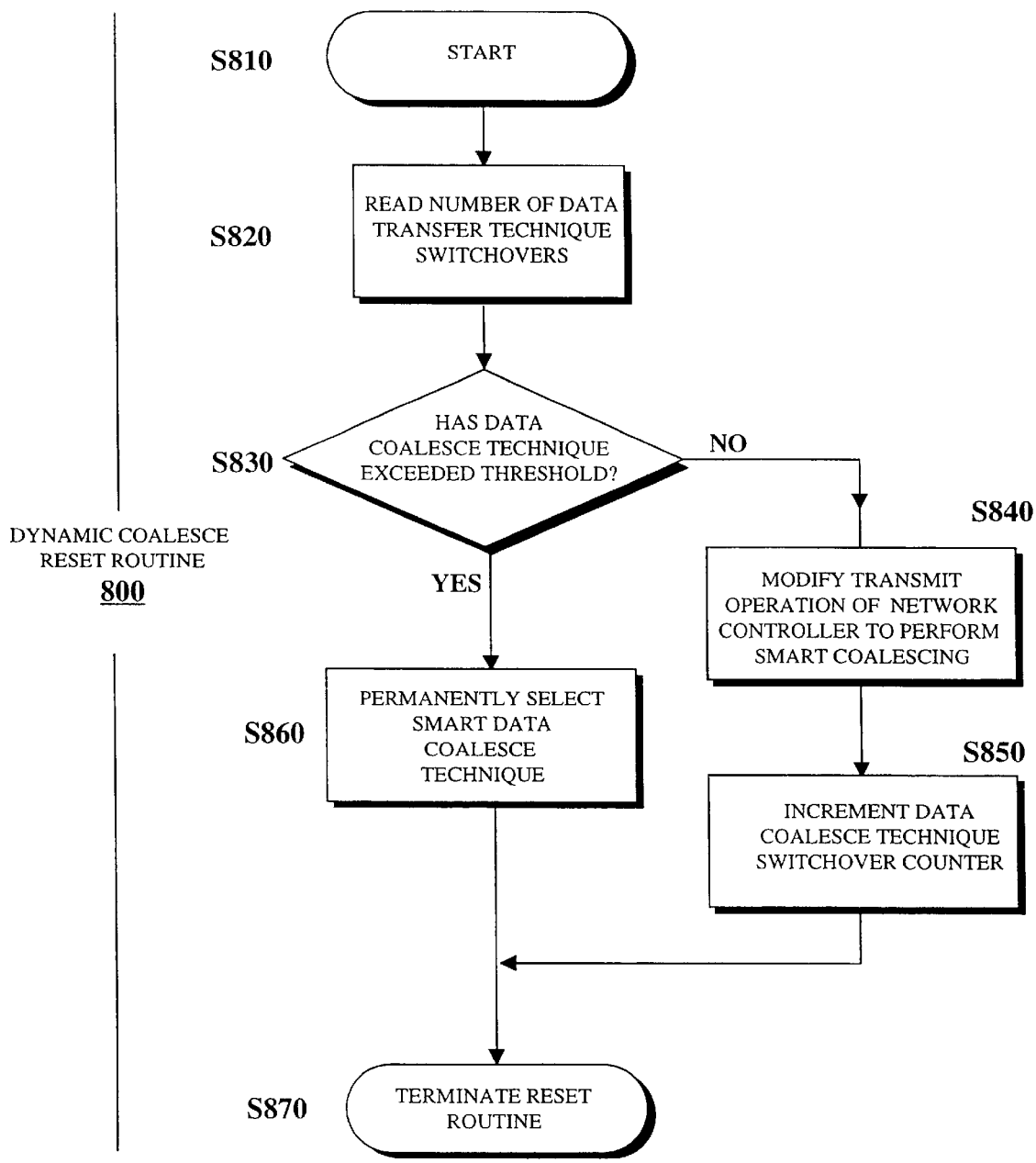

FIG. 8 illustrates the last part of this embodiment, the dynamic coalesce reset routine 800, which is triggered only after the network controller was reset. The reset could be caused by a variety of factors, including a system shut-down condition, a hemorrhaging of transmit errors, or as part of a power-management feature. Upon resetting, the reset routine 800, in step S620, reads the number of data coalesce switchovers, tracked by the statistical monitoring module of FIG. 6 step S640. In step S830, the reset routine 600 determines whether the number of switchovers exceeds the switchover threshold, also defined in the statistical monitoring module of FIG. 6 step S640. If the switchover threshold has been exceeded, then the reset routine 800 permanently selects the "smart" coalesce technique, as shown in step S860. This permanent selection is justified given the high number of switchovers. The reset routine 800 is subsequently terminated, as per step S870, and the smart coalesce technique continues until the next reset operation. If the switchover threshold has not been exceeded, then the reset routine 800 advances to step S840.

In step S840, the reset routine 800 modifies the transmit operation of the network controller to switch back to the non-coalesce technique. The fact that the transmit error threshold has not been exceeded, suggests that the PCI bus is no longer congested and can support PCI-intensive data transfers. In step S850, the reset routine 800 increments the data transfer switchover counter in the statistical monitoring module of FIG. 6 step S640, and is subsequently terminated.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A method of dynamically selecting a technique to coalesce data from a system main memory to a network controller via a system bus infrastructure, said method comprising:

examining configuration parameters of said system;

selecting a first data coalesce technique based on said configuration parameters;

first transporting data from said main memory to said network controller in accordance with said first data coalesce technique;

collecting transmit underrun error statistics as said network controller receives data from said main memory and transmits data;

analyzing said collected error statistics according to a first predetermined periodic interval and determining whether said error statistics exceed a predefined transmit error threshold;

automatically switching to a second data coalesce technique if said error statistics exceed said transmit error threshold; and second transporting data from said main memory to said network controller in accordance with said second data coalesce technique.

2. The method of claim 1, wherein said first data coalesce technique includes storing addresses of locations of said main memory containing data in a data structure, and transferring contents of said data structure and contents of said main memory locations to said system bus infrastructure for transport.

3. The method of claim 2, wherein said second data coalesce technique includes, determining which ones of said main memory locations contain smaller quantities of data and larger quantities of data, copying contents of main memory locations having smaller quantities of data, storing said contents of said main memory locations with smaller quantities of data into a supplemental memory structure, storing addresses of said main memory locations having larger quantities of data in said data structure, and transferring contents of said data structure, said supplemental memory structure, and contents of said main memory locations having larger quantities of data to said system bus infrastructure for transport.

4. The method of claim 3, wherein said collecting occurs according to a second predetermined periodic interval, said first periodic interval being longer than said second periodic interval.

5. The method of claim 4, further including storing a switchover number indicating the number of times said automatic switchover occurred.

6. The method of claim 5, further including, examining said switchover number, and determining whether said switchover number exceeds a switchover threshold.

7. The method of claim 6, wherein said switchover number is incremented and said first data coalesce technique is automatically switched back to if said switchover number does not exceed said switchover threshold.

8. The method of claim 6, wherein said second data coalesce technique is selected if said switchover number exceeds said switchover threshold.

9. A system for transporting data from a main memory to a network controller based on dynamically selecting a data coalesce technique, said system comprising:
- a bus infrastructure interconnecting said main memory and said network controller;
- a registry including a set of configuration parameters indicating a first data coalesce technique, wherein data is transported from said main memory to said network controller in accordance with said first data coalesce technique;
- a first statistical timer for providing a first predetermined periodic interval; and
- a statistical monitoring module for collecting and analyzing transmit underrun error statistics as said network controller receives data from said main memory and transmits data to said data network, said monitoring module analyzes said collected error statistics according to said first predetermined periodic interval and determines whether said error statistics exceed a predefined transmit error threshold, wherein said system automatically switches over to a second data coalesce technique for transporting data from said main memory to said network controller if said error statistics exceed said transmit error threshold.

10. The system of claim 9, wherein said first data coalesce technique includes
- storing addresses of locations of said main memory containing data in a data structure, and
- transferring contents of said data structure and contents of said main memory locations to said system bus infrastructure for transport.

11. The system of claim 10, wherein said second data coalesce technique includes,
- determining which ones of said main memory locations contain smaller quantities of data and larger quantities of data,
- copying contents of main memory locations having smaller quantities of data,
- storing said contents of said main memory locations with smaller quantities of data into a supplemental memory structure,
- storing addresses of said main memory locations having larger quantities of data in said data structure, and
- transferring contents of said data structure, said supplemental memory structure, and contents of said main memory locations having larger quantities of data to said system bus infrastructure for transport.

12. The system of claim 11, wherein said monitoring module collects said error statistics according to a second predetermined periodic interval, said first periodic interval being longer than said second periodic interval.

13. The system of claim 12, further including a reset module containing a switchover number indicating the number of times said automatic switchover has occurred.

14. The system of claim 13, wherein said reset module examines said switchover number and determines whether said switchover number exceeds a switchover threshold.

15. The system of claim 14, wherein said reset module automatically switches back to said first data coalesce technique and increments said switchover number, if said switchover number does not exceed said switchover threshold.

16. The system of claim 14, wherein said reset module selects second data coalesce technique if said switchover number exceeds said switchover threshold.

17. A method of dynamically selecting a technique to coalesce data from a system main memory to a network controller via a system bus infrastructure, said method comprising:
- examining configuration parameters of said system;
- selecting a first data coalesce technique based on said configuration parameters, said first data coalesce technique storing addresses of locations of said main memory containing data in a data structure;
- first transporting data from said main memory to said network controller in accordance with said first data coalesce technique, wherein said first transporting data includes transporting contents of said data structure and contents of said main memory locations to said system bus infrastructure for transport;
- collecting transmit underrun error statistics as said network controller receives data from said main memory and transmits data;
- analyzing said collected error statistics according to a first predetermined periodic interval and determining whether said error statistics exceed a predefined transmit error threshold;
- automatically switching to a second data coalesce technique if said error statistics exceed said transmit error threshold, said second data coalesce technique determining which ones of said main memory locations contain smaller quantities of data and larger quantities of data, copying contents of main memory locations having smaller quantities of data, storing said contents of said main memory locations with smaller quantities of data into a supplemental memory structure, and storing addresses of said main memory locations having larger quantities of data in said data structure; and
- second transporting data from said main memory to said network controller in accordance with said second data coalesce technique, wherein second transporting data includes transporting contents of said data structure, said supplemental memory structure, and contents of said main memory locations having larger quantities of data to said system bus infrastructure for transport.

18. The method of claim 17, further including,
- a second predetermined periodic interval for indicating when said collecting occurs, said first periodic interval being longer than said second periodic interval, and
- storing a switchover number indicating the number of times said automatic switchover occurred.

19. The method of claim 17, further including,
- examining said switchover number,
- determining whether said switchover number exceeds a switchover threshold, and
- incrementing said switchover number and automatically switching back to said first data coalesce technique if said switchover number does not exceed said switchover threshold.

20. The method of claim 19, wherein said second data coalesce technique is selected if said switchover number exceeds said switchover threshold.

21. A computer-readable medium encoded with a plurality of processor-executable instruction sequences for:

examining configuration parameters of said system;

selecting a first data coalesce technique based on said configuration parameters;

first transporting data from said main memory to said network controller in accordance with said first data coalesce technique;

collecting transmit underrun error statistics as said network controller receives data from said main memory and transmits data;

analyzing said collected error statistics according to a first predetermined periodic interval and determining whether said error statistics exceed a predefined transmit error threshold;

automatically switching to a second data coalesce technique if said error statistics exceed said transmit error threshold; and second transporting data from said main memory to said network controller in accordance with said second data coalesce technique.

22. The computer-readable medium of claim 21, wherein said first data coalesce technique includes storing addresses of locations of said main memory containing data in a data structure, and transferring contents of said data structure and contents of said main memory locations to said system bus infrastructure for transport.

23. The computer-readable medium of claim 22, wherein said second data coalesce technique includes, determining which ones of said main memory locations contain smaller quantities of data and larger quantities of data, copying contents of main memory locations having smaller quantities of data, storing said contents of said main memory locations with smaller quantities of data into a supplemental memory structure, storing addresses of said main memory locations having larger quantities of data in said data structure, and transferring contents of said data structure, said supplemental memory structure, and contents of said main memory locations having larger quantities of data to said system bus infrastructure for transport.

24. The computer-readable medium of claim 23, wherein said collecting occurs according to a second predetermined periodic interval, said first periodic interval being longer than said second periodic interval.

25. The computer-readable medium of claim 24, further including storing a switchover number indicating the number of times said automatic switchover occurred.

26. The computer-readable medium of claim 25, further including, examining said switchover number, and determining whether said switchover number exceeds a switchover threshold.

27. The computer-readable medium of claim 26, wherein said switchover number is incremented and said first data coalesce technique is automatically switched back to if said switchover number does not exceed said switchover threshold.

28. The computer-readable medium of claim 26, wherein said second data coalesce technique is selected if said switchover number exceeds said switchover threshold.

* * * * *